US006546054B1

United States Patent
Kawada et al.

(10) Patent No.: US 6,546,054 B1
(45) Date of Patent: Apr. 8, 2003

(54) VIDEO TRANSMISSION SYSTEM USING PLURAL LINKS

(75) Inventors: Ryoichi Kawada, Tokyo (JP);
Takahiro Hamada, Saitama (JP);
Shuichi Matsumoto, Tokyo (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/501,720

(22) Filed: Feb. 10, 2000

(30) Foreign Application Priority Data

Feb. 12, 1999 (JP) .......................................... 11-033787

(51) Int. Cl.⁷ ................................................ H04N 7/12
(52) U.S. Cl. .............................. 375/240.29; 375/240.28
(58) Field of Search ........................ 375/240.1, 240.13, 375/240.17, 240.21, 240.28, 240.29; 348/409.1, 423.1, 427.1; 370/228, 242, 464, 16; 359/119, 110; H04N 7/12

(56) References Cited

U.S. PATENT DOCUMENTS 5,539,726 A * 7/1996 Mizusawa .................... 370/16
5,680,389 A * 10/1997 Douglas et al. ............. 370/228
6,052,210 A * 4/2000 Nathan ........................ 359/119

* cited by examiner

Primary Examiner—Nhon Diep
(74) Attorney, Agent, or Firm—Armstrong, Westerman & Hattori, LLP

(57) ABSTRACT

An input video signal is distributed to two links. The distributed video signals are coded by encoders in a space-wise or timewise shifted manner, and then, are transmitted over the transmission links. On a receiving side, the video signals are decoded by decoders, respectively. An averaging processor determines an average of the video signals per pixel, and then, outputs it. A data selector selects an output from the averaging processor when the plural links are operated normally; to the contrary, it selects a decoded output on the normal link in the case where an accident occurs in any one of the plural links. Specific methods for shifting the video signals spacewise or timewise include: a method for shifting a timing of intra-frame coding; a method for shifting the video signals on the links by several pixels or lines at least one of upward, downward, rightward and leftward; a method for disposing a sampling conversion filter in at least one of the links; and the like. According to the present invention, it is possible to provide a video transmission system using the plural links in which the transmission capacity of a backup link can be effectively used while high reliability of transmission can be ensured.

15 Claims, 4 Drawing Sheets

Fig. 1
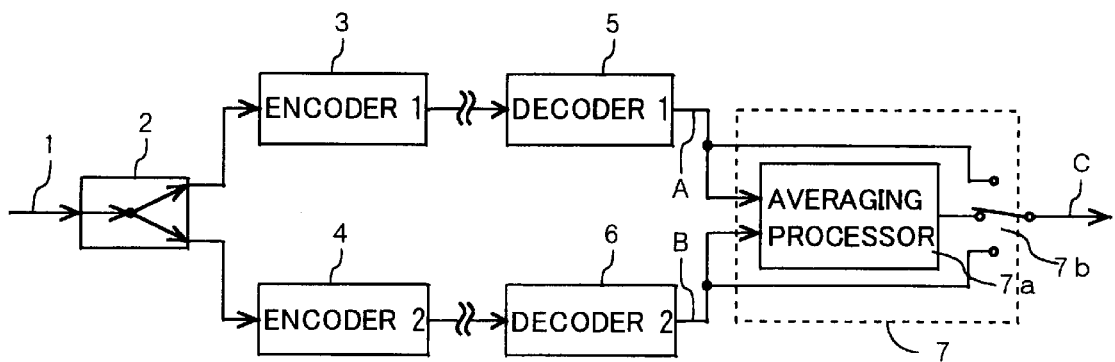
Fig. 3A
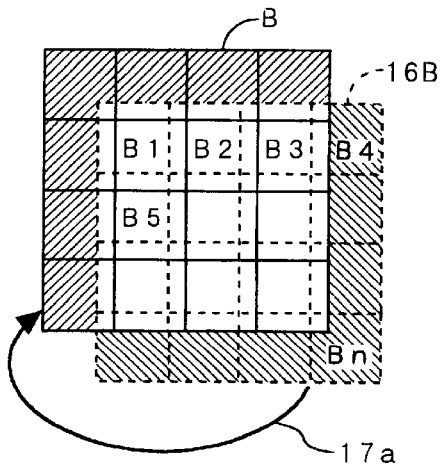
Fig. 3B
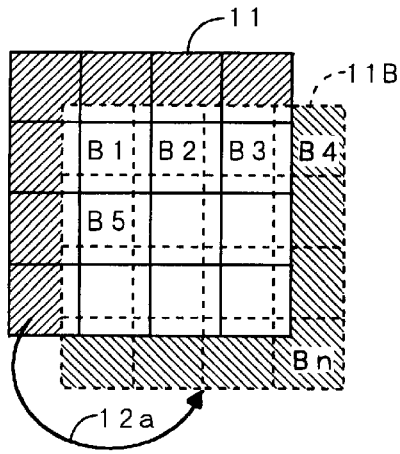
Fig. 3C

○: INTEGER PIXEL POSITION
×: HALF PIXEL POSITION

VIDEO TRANSMISSION SYSTEM USING PLURAL LINKS

BACKGROUND OF THE INVENTION

1. Field of the Invention

The present invention relates to a video transmission system using plural links and, more particularly, to a video transmission system using plural links suitable for transmitting compressed video signals.

2. Description of the Related Art

Multiple video transmission through different links has been conventionally used for enhancing reliability of transmission. One example of such conventional transmission will be described below in reference to FIG. 6.

FIG. 6 illustrates a duplex video transmission using regular and backup links. An input video signal 40 is distributed to two links by a distributor 41. In the case of digital compression coding transmission, encoders 42 and 44 for video signal compression and decoders 43 and 45 are used in the two links, respectively. Assuming that the link consisting of the encoder 42 and the decoder 43 is referred to as a regular link and the link consisting of the encoder 44 and the decoder 45 is referred to as a backup link, a switcher 46 selects the regular link at the time of normal transmission, to output an output video signal 47. To the contrary, in the case where an accident occurs on the regular link, the switcher 46 immediately switches the transmission link to the backup link, to thus output an output video signal 47.

In this way, the above-described duplex video transmission using the regular and backup links can ensure the high reliability of the video signal transmission.

However, the above-described duplex video transmission using the regular and backup links has raised a problem that the transmission links are used with low efficiency since the backup link is not used at all during the normal transmission which accounts for most of the transmission period of time.

SUMMARY OF THE INVENTION

An object of the present invention is to provide a video transmission system using plural links in which the transmission capacity of a backup link can be effectively used while high reliability of transmission can be ensured.

The first aspect of the invention lies in that a video transmission system using plural links for transmitting video signals over the plural links comprises means for distributing an input video signal to the plural links, and processing means for coding the video signals distributed to the links in such a manner as to shift them from each other at least either spacewise or timewise.

The second aspect of the invention lies in that a video transmission system using plural links for transmitting video signals over the plural links comprises decoding means for decoding the coded video signals transmitted over the plural links, synthesizing means for synthesizing the video signals from the plural links decoded by said decoding means, the video signals being shifted from each other at least either spacewise or timewise, and output selecting means for selectively outputting the decoded outputs on the links and an output from said synthesizing means, said output selecting means selecting the output from said synthesizing means when the plural links are operated normally while selecting the decoded output on the normal link in the case where abnormality occurs on any one of the plural links.

The third aspect of the invention lies in that a video transmission system using plural links for transmitting video signals over the plural links comprises means for distributing an input video signal to the plural links, processing means for coding the video signals distributed to the links in such a manner as to shift them from each other at least either spacewise or timewise, decoding means for decoding the coded video signals transmitted over the plural links, synthesizing means for synthesizing the video signals from the plural links decoded by said decoding means, the video signals being shifted from each other at least either spacewise or timewise, and output selecting means for selectively outputting the decoded outputs on the links and an output from said synthesizing means, said output selecting means selecting the output from said synthesizing means when the plural links are operated normally while selecting the decoded output on the normal link in the case where abnormality occurs on any one of the plural links.

According to the present invention, the video signals on the links are coded in such a manner as to be shifted from each other at least either spacewise or timewise, so that the video signals transmitted over the plural links are synthesized, thereby obtaining the output video signal similar to the original video signal. Furthermore, it is possible to obtain a normal video signal also over a single link.

BRIEF DESCRIPTION OF THE DRAWINGS

FIG. 1 is a block diagram illustrating the schematic configuration of a video transmission system using plural links in a first embodiment according to the present invention.

FIGS. 3A to 3C illustrate the processing of a preprocessor and a postprocessor of the second embodiment.

DETAILED DESCRIPTION OF THE PREFERRED EMBODIMENTS

Figure 2:
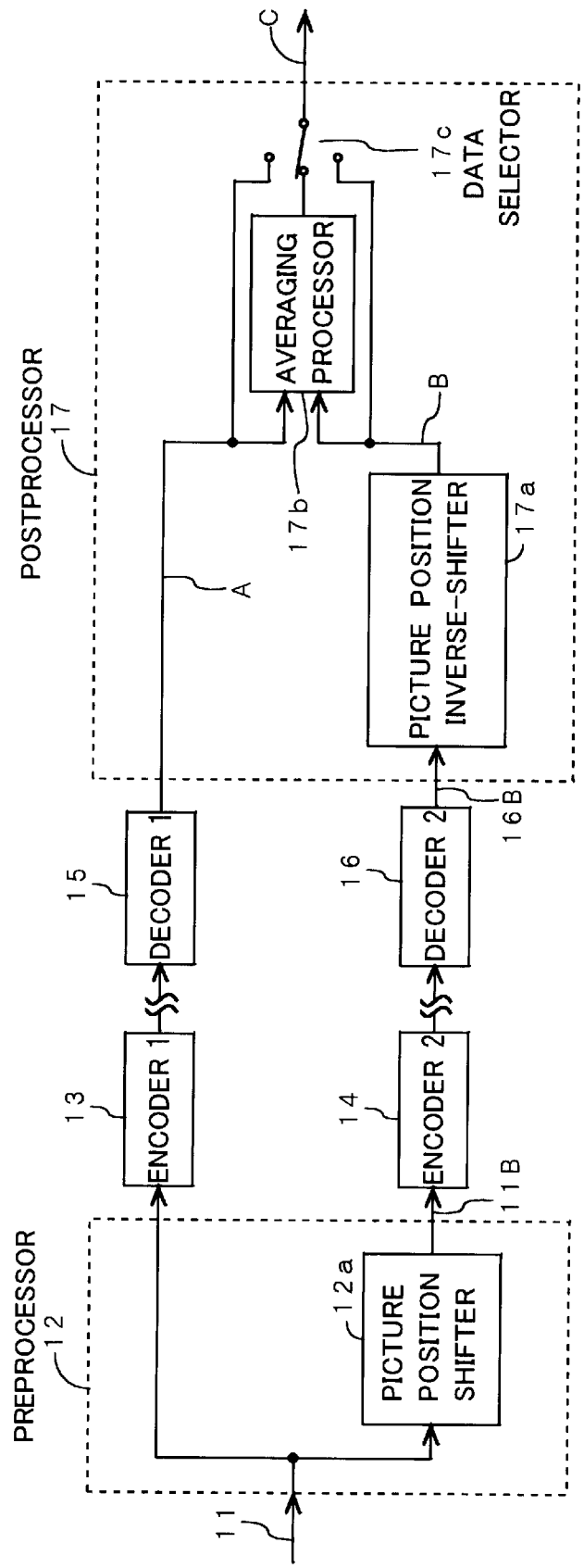
FIG. 2 is a block diagram illustrating the schematic configuration of a second embodiment of the present invention.

The present invention will be described below in reference to the drawings. FIG. 1 is a block diagram illustrating the schematic configuration of a video transmission system using plural links in a first embodiment of the present invention.

A preprocessor 2 comprises a typical distributor for distributing and outputting an input video signal 1 to two links. The video signals distributed by the preprocessor 2 are input into a first encoder 3 and a second encoder 4, respectively. Here, although MPEG2 or the like can be used for the encoders 3 and 4, the present invention is not limited to the MPEG2, but an encoder of an arbitrary system can be used.

The video signals compressed and coded in the first and second encoders 3 and 4 are transmitted over transmission links in a well-known system, and then, are input into first and second decoders 5 and 6 disposed on a side of a receiving station, respectively, to be decoded therein. The video signals A and B respectively decoded by the first and second decoders 5 and 6 are input into a postprocessor 7. The postprocessor 7 comprises an averaging processor 7a and a data selector 7b. The averaging processor 7a performs the processing of determining an average of the video signals A and B, i.e., (A+B)/2. The data selector 7b selects the output from the averaging processor 7a when the two transmission links are normal; it selects the second transmission link when abnormality occurs on the first transmission link; otherwise, it selects the first transmission link when abnormality occurs on the second transmission link. Finally, the data selector 7b outputs an output video signal C.

In the present embodiment, timings of coding performed by the first and second encoders 3 and 4, that is, intra-frame coding, are shifted from each other. In the MPEG2, as well known, a GOP (a group of pictures) consists of three kinds of pictures, i.e., I, P and B, in which one cycle is composed of 15 pictures arrayed in I, B, B, P, B, B, P, . . . In the present embodiment, the timings of the intra-frame coding (I picture) in the cycle are shifted from each other in the first and second encoders 3 and 4. This shift can be almost always achieved as long as the first and second encoders 3 and 4 are operated independently of each other.

If video data different in I picture obtained by the first and second encoders 3 and 4 are decoded by the first and second decoders 5 and 6, respectively, coding degradation included in the video signals A and B output from the first and second decoders 5 and 6 approximates to statistical independence. The averaging processor 7a in the postprocessor 7 takes an average of the video signals A and B, so as to smoothen the coding degradation. As in the present embodiment, in the case where the coding degradation of the two links are statistically independent of each other, the degradation can be halved by taking the average of the coding degradations of the two links. This signifies improvement of about 3 dB in view of an S/N ratio.

Next, in the case where an accident occurs on either one of the two links, the data selector 7b selects the video signal on the normal link to thus output it.

As described above, in the present embodiment, in the case where both the two links are normal, the video signal having the S/N ratio increased by about 3 dB can be output by averaging the timewise shifted video signals transmitted over the two transmission links, so that the two transmission links can be effectively used all the time. To the contrary, in the case where an accident occurs on either one of the two links, the video signal transmitted over the normal link can be used, so that high reliability can be ensured, like in the prior art.

Subsequently, a second embodiment of the present invention will be explained in reference to FIG. 2. In the second embodiment, an input video signal 11 is distributed to two links by a preprocessor 12. One of the two video signals is transmitted to a first encoder 13; in the meanwhile, the other video signal is shifted at its picture position by a picture position shifter 12a, and then, is input into a second encoder 14. Video data coded by the first encoder 13 is propagated over a first transmission link by a well-known system, is decoded by a decoder 15 on a receiving side, and thereafter, is input into a postprocessor 17. In the meantime, video data coded by the second encoder 14 is propagated over a second transmission link by a well-known system in the same manner as in the first link, and is decoded by a decoder 16 on the receiving side. The decoded video signal 16B is input into a picture position inverse-shifter 17a in the postprocessor 17, and thereafter, the position of the picture shifted by the picture position shifter 12a is returned to the original position of the video signal 11.

A video signal A output from the decoder 15 and a video signal B output from the picture position inverse-shifter 17a are input into an averaging processor 17b, which performs the processing of (A+B)/2. In the case of normal operation of both the first and second links, a data selector 17c selects the averaging processor 17b, and then, outputs a video signal (A+B)/2 as an output video signal C. To the contrary, if an accident occurs on either one of the first and second links, the data selector 17c selects the output transmitted over the normal link, and then, outputs it as an output video signal C.

Next, explanation will be made on the processing of the picture position shifter 12a and the picture position inverse-shifter 17a.

Now, assuming that the input video signal 11 is a video signal illustrated in FIG. 3A, the preprocessor 12 inputs the video signal 11 into the first encoder 13. The encoder 13 codes macro blocks A1, A2, A3, . . . and An of the video signal 11. In contrast, the picture position shifter 12a outputs the video signal 11 at a reading position shifted rightward by several pixels and downward by several lines, as illustrated in FIG. 3B. For example, an upper left macro block B1 in a video signal 11B output from the picture position shifter 12a is composed of part of each of the macro blocks A1, A2, A5 and A6 in the video signal 11; and further, another macro block B2 is composed of part of each of the macro blocks A2, A3, A6 and A7 in the video signal 11. Moreover, part of the video signal which lies off by the shifting processing, i.e., hatched part of the video signal 11 is added to spotted part of the video signal 11B. Consequently, the second encoder 14 codes the macro blocks B1, B2, B3, . . . and Bn of the video signal 11B. Although in this embodiment the reading position of the video signal 11 is shifted rightward and downward, the present invention is not limited to these directions, and the position may be arbitrarily shifted rightward, leftward, upward and downward.

Subsequently, as shown in FIG. 3C, the picture position inverse-shifter 17a functions to return a video signal 16B corresponding to the video signal 11B decoded by the decoder 16 to the video signal B having the same position as that of the original video signal 11. Here, it would have been obvious for one skilled in the art to shift or return the picture reading position by controlling a video signal writing/reading address or timing by the use of a frame memory, a FIFO or the like, and therefore, the detailed explanation will be omitted.

As is obvious from the above-described description, in the present embodiment, the video signal on the second link is shifted spacewise, so that the two encoders 13 and 14 are relatively different in boundary of the coding range of the video signal 11. For example, in the case of an encoder per block as in the MPEG2 or the like, the positions on the video signal of the boundary between the blocks are shifted relatively to each other on the two links, as described above. Consequently, coding degradation superimposed on the video signals output from the encoders 13 and 14 approximates to statistical independence in the same manner as the first embodiment. Furthermore, the postprocessor 17 returns the shifted video signal to the original video signal, and then, outputs the average of the video signals on both the links. Therefore, in the case of the normal operation of both the two transmission links, it is possible to increase an S/N ratio by about 3 dB in the same manner as the first embodiment. In the case where an accident occurs on either one of the two transmission links, the data selector 17c of the postprocessor 17 selects the normal link to thus output the video signal, thereby ensuring high reliability in the same manner as the prior art.

Figure 4:
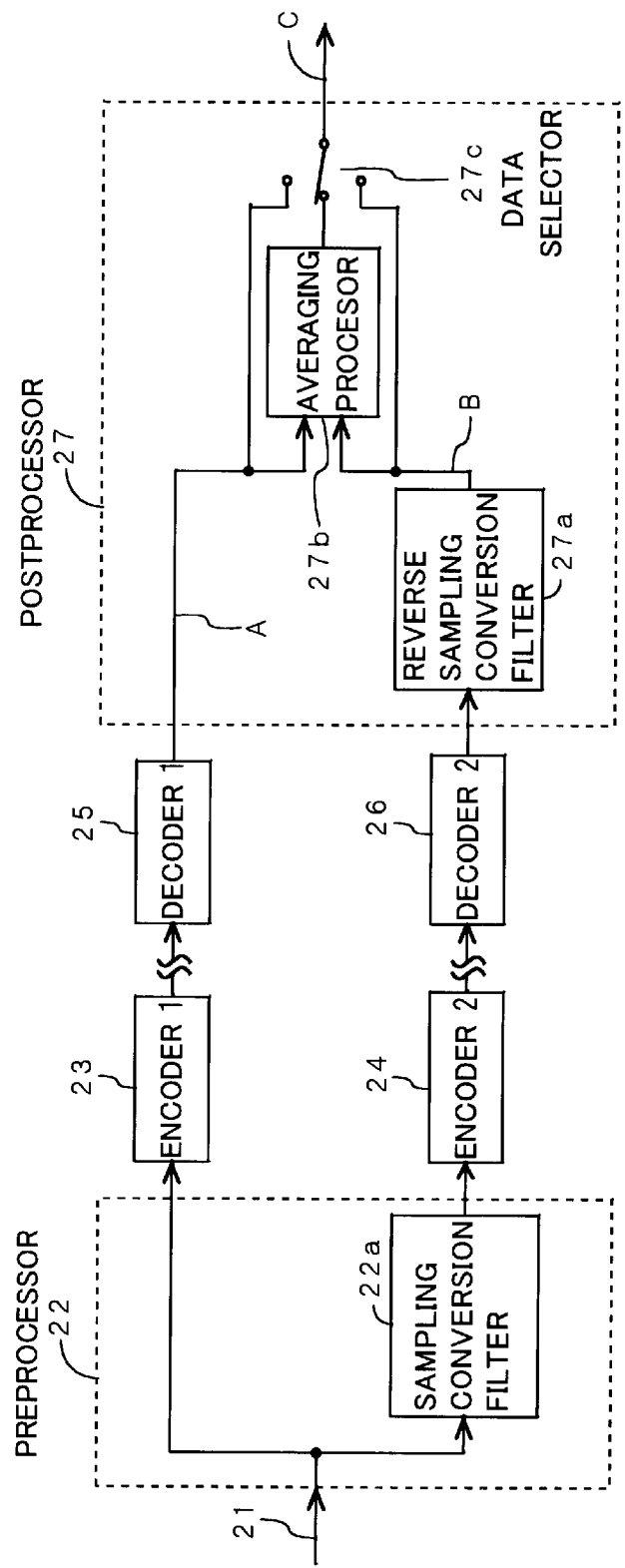
FIG. 4 is a block diagram illustrating the schematic configuration of a third embodiment of the present invention.

Subsequently, a third embodiment according to the present invention will be explained in reference to FIG. 4. In the third embodiment, an input video signal 21 is input into a preprocessor 22, and then, is distributed to two links. A video signal on one of the two links is coded by an encoder 23, to be transmitted over one transmission link. Another video signal on the other link is sample-converted by a sampling conversion filter 22a, and thereafter, is coded by another encoder 24, to be transmitted over the other transmission link. On a side of a receiving station, the video signal transmitted over one of the two links is decoded by a decoder 25; in the meanwhile, the video signal transmitted over the other link is decoded by another decoder 26, to be input into a reverse sampling conversion filter 27a. The present embodiment is featured in that the preprocessor 22 includes the sampling conversion filter 22a and a postprocessor 27 includes the reverse sampling conversion filter 27a.

Figure 5:
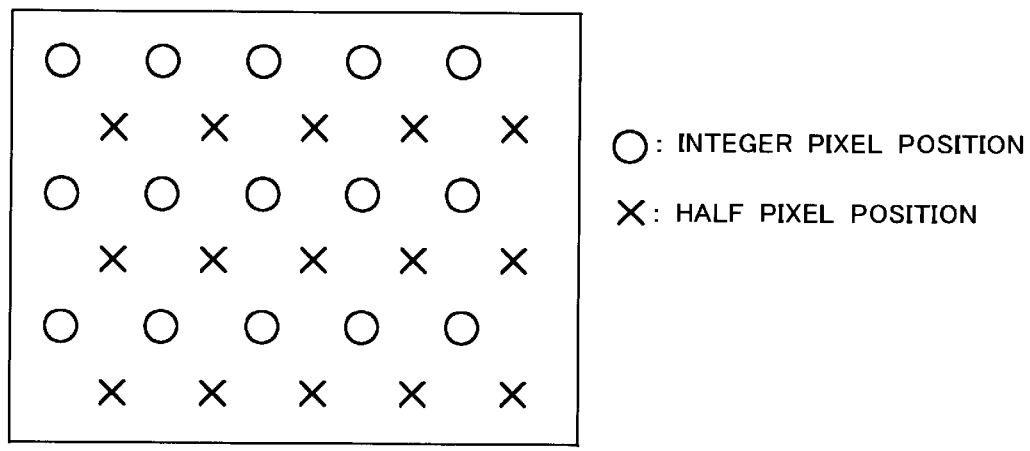
FIG. 5 illustrates the processing of a preprocessor of the third embodiment.
Figure 6:
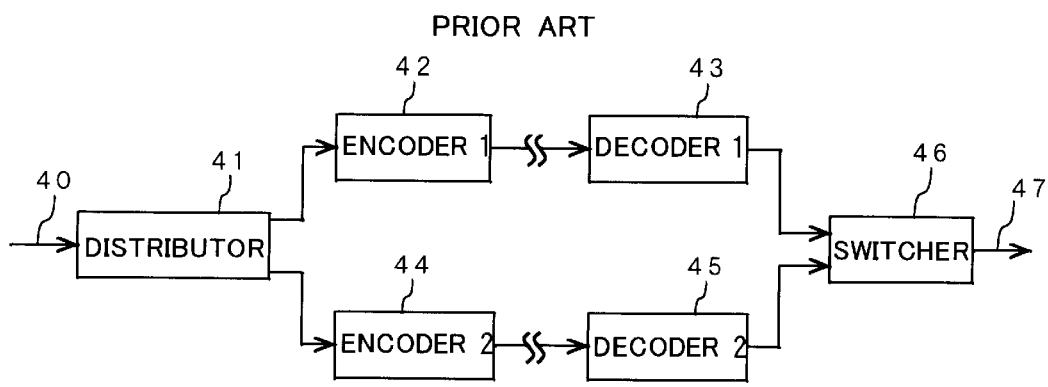
FIG. 6 is a block diagram illustrating the schematic configuration of the prior art.

In the present embodiment, the sampling conversion filter 22a performs processing in such a manner that a pixel position of a picture after sampling conversion is located at a half-pixel position (indicated by x) intermediate between integer pixel positions (indicated by o) of the input video signal 21, as illustrated in FIG. 5. The sampling conversion is not limited to the half-pixel position, but may be performed at arbitrary non-integer pixel positions. With this processing, it is possible to obtain the video signals on the links, having the relationship spacewise shifted from each other.

The video signal processed by the sampling conversion filter 22a is coded by the encoder 24, and then, is transmitted by a well-known system. The video signal received on the receiving side is decoded by the decoder 26, and thereafter, is input into the reverse sampling conversion filter 27a. The decoded video signal is reversely sample-converted by the reverse sampling conversion filter 27a, and then, is sent to an averaging processor 27b, which takes an average of a video signal A output from the decoder 25 and another video signal B output from the reverse sampling conversion filter 27a. A data selector 27c selects the output from the averaging processor 27b as an output video signal C when both the links are operated normally; to the contrary, it selects the output video signal transmitted over the normal link in the case where an accident occurs on either one of the links.

In the present embodiment, the encoder 24 codes the video signal processed by the sampling conversion filter 22a, so that coding degradation by the first encoder 23 and coding degradation by the second encoder 24 approximates to statistical independence. Consequently, when the averaging processor 27b averages the decoded video signals A and B transmitted over the two links, an S/N ratio is principally increased by about 3 dB in the same manner as those in the above-described first and second embodiments. Therefore, it is possible to effectively use the second link, i.e., a backup line. Furthermore, in the case where an accident occurs on either one of the two links, the video signal on the normal link can be output, thereby ensuring high reliability.

Although the embodiments have been described above by way of the two transmission links, it is to be understood that the present invention is not limited to the two links, but is applicable to multiple transmission in which three or more links are used. Moreover, although the description has been given of the embodiments in which the respective video signals on the links are shifted either timewise or spacewise, the video signals may be shifted both timewise and spacewise.

As is obvious from the above description, according to the present invention, in the video transmission system using the plural links for transmitting the video signals over the plural links, the video signals on the links are shifted at least either spacewise or timewise, wherein the video signals transmitted over the plural links are synthesized when the plural links are operated normally, thereby obtaining the high-quality output video signal more similar to the original video signal. Thus, it is possible to effectively use the transmission capacity of the backup link. Furthermore, in the case where an accident occurs on either one of the plural links, the normal link can be selected, thereby ensuring the high reliability of the transmission.

What is claimed is:

1. A video transmission system using plural links for transmitting video signals over the plural links, said video transmission system comprising:

means for distributing an input video signal to the plural links; and processing means for coding the video signals distributed to the links by shifting the video signal relative to another video signal transmitted over a different link of the plural links either in space or time, wherein said shifting occurs prior to transmission over the plural links.

2. A video transmission system using plural links for transmitting video signals over the plural links, said video transmission system comprising:

decoding means for decoding the coded video signals transmitted over the plural links;

synthesizing means for synthesizing the video signals from the plural links decoded by said decoding means, the video signals being shifted from each other at least either spacewise or timewise; and output selecting means for selectively outputting the decoded outputs on the links and an output from said synthesizing means, said output selecting means selecting the output from said synthesizing means when the plural links are operated normally while selecting the decoded output on the normal link in the case where abnormality occurs on any one of the plural links.

3. A video transmission system using plural links for transmitting video signals over the plural links, said video transmission system comprising:

means for distributing an input video signal to the plural links;

processing means for coding the video signals distributed to the links by shifting the video signal relative to another video signal transmitted over a different link of the plural links either in space or time, wherein said shifting occurs prior to transmission over the plural links;

decoding means for decoding the coded video signals transmitted over the plural links;

synthesizing means for synthesizing the video signals from the plural links decoded by said decoding means, the video signals being shifted from each other at least either spacewise or timewise; and output selecting means for selectively outputting the decoded outputs on the links and an output from said synthesizing means, said output selecting means selecting the output from said synthesizing means when the plural links are operated normally while selecting the decoded output on the normal link in the case where abnormality occurs on any one of the plural links.

4. A video transmission system using plural links as claimed in claim 1, wherein a timing of intra-frame coding by said processing means is shifted, thus timewise shifting the video signals on the links.

5. A video transmission system using plural links as claimed in claim 3, wherein a timing of intra-frame coding by said processing means is shifted, thus timewise shifting the video signals on the links.

6. A video transmission system using plural links as claimed in claim 1, wherein said processing means comprises:

preprocessing means for shifting the video signal transmitted over at least one of the links by several pixels or lines in at least one direction out of upward, downward, rightward and leftward directions; and encoding means provided on the links, for coding the video signals processed by said preprocessing means, the video signals on the links being coded in a spacewise shifted manner.

7. A video transmission system using plural links as claimed in claim 3, wherein said processing means comprises:

preprocessing means for shifting the video signal transmitted over at least one of the links by several pixels or lines in at least one direction out of upward, downward, rightward and leftward directions; and encoding means provided on the links, for coding the video signals processed by said preprocessing means, the video signals on the links being coded in a spacewise shifted manner.

8. A video transmission system using plural links as claimed in claim 1, wherein said processing means comprises:

a sampling conversion filter disposed on at least one of the links; and encoding means respectively disposed on the links for coding the video signals processed by said sampling conversion filter;

the video signals on the links being coded in a spacewise shifted manner.

9. A video transmission system using plural links as claimed in claim 3, wherein said processing means comprises:

a sampling conversion filter disposed on at least one of the links; and encoding means respectively disposed on the links for coding the video signals processed by said sampling conversion filter;

the video signals on the links being coded in a spacewise shifted manner.

10. A video transmission system using, plural links as claimed in claim 2, wherein said synthesizing means takes an average of pixels corresponding to the decoded video signals transmitted over the links, so as to smooth coding noise.

11. A video transmission system using plural links as claimed in claim 3, wherein said synthesizing means takes an average of pixels corresponding to the decoded video signals transmitted over the links, so as to smooth coding noise.

12. A video transmission system using plural links as claimed in claim 10, further comprising processing means for returning the video signal on at least one of the links shifted by several pixels or lines in at least one direction out of upward, downward, rightward and leftward directions to an original video signal.

13. A video transmission system using plural links as claimed in claim 11, further comprising processing means for returning the video signal on at least one of the links shifted by several pixels or lines in at least one direction out of upward, downward, rightward and leftward directions to an original video signal.

14. A video transmission system using plural links as claimed in claim 10, by which the positions of the pixels of the original video signal are restored for least one of the decoded video signals.

15. A video transmission system using plural links as claimed in claim 11, by which the positions of the pixels of the original video signal are restored for least one of the decoded video signals.

\* \* \* \* \*